Aug. 22, 1961 R. M. A. FERMIER 2,996,900
FLEXIBLE COUPLING
Filed Jan. 11, 1960 2 Sheets-Sheet 2
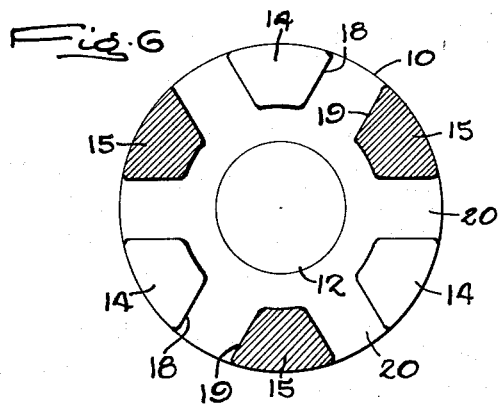
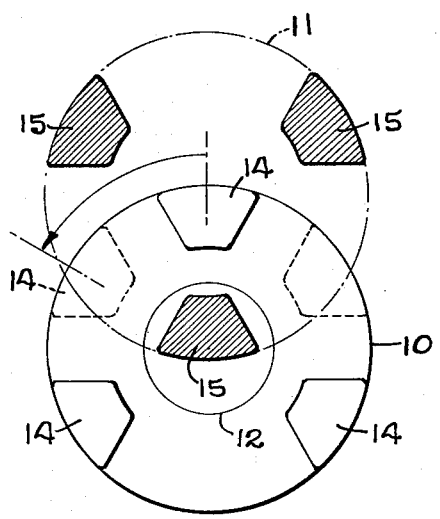
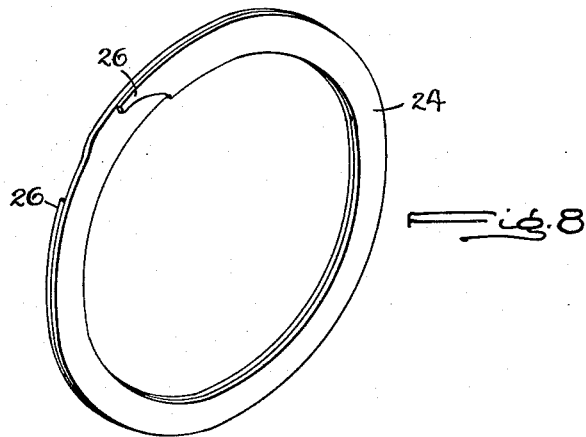
INVENTOR
Rex M A Fermier
By Wolfe, Hubbard, Voit & Osann
ATTORNEYS United States Patent Office 2,996,900
Patented Aug. 22, 1961

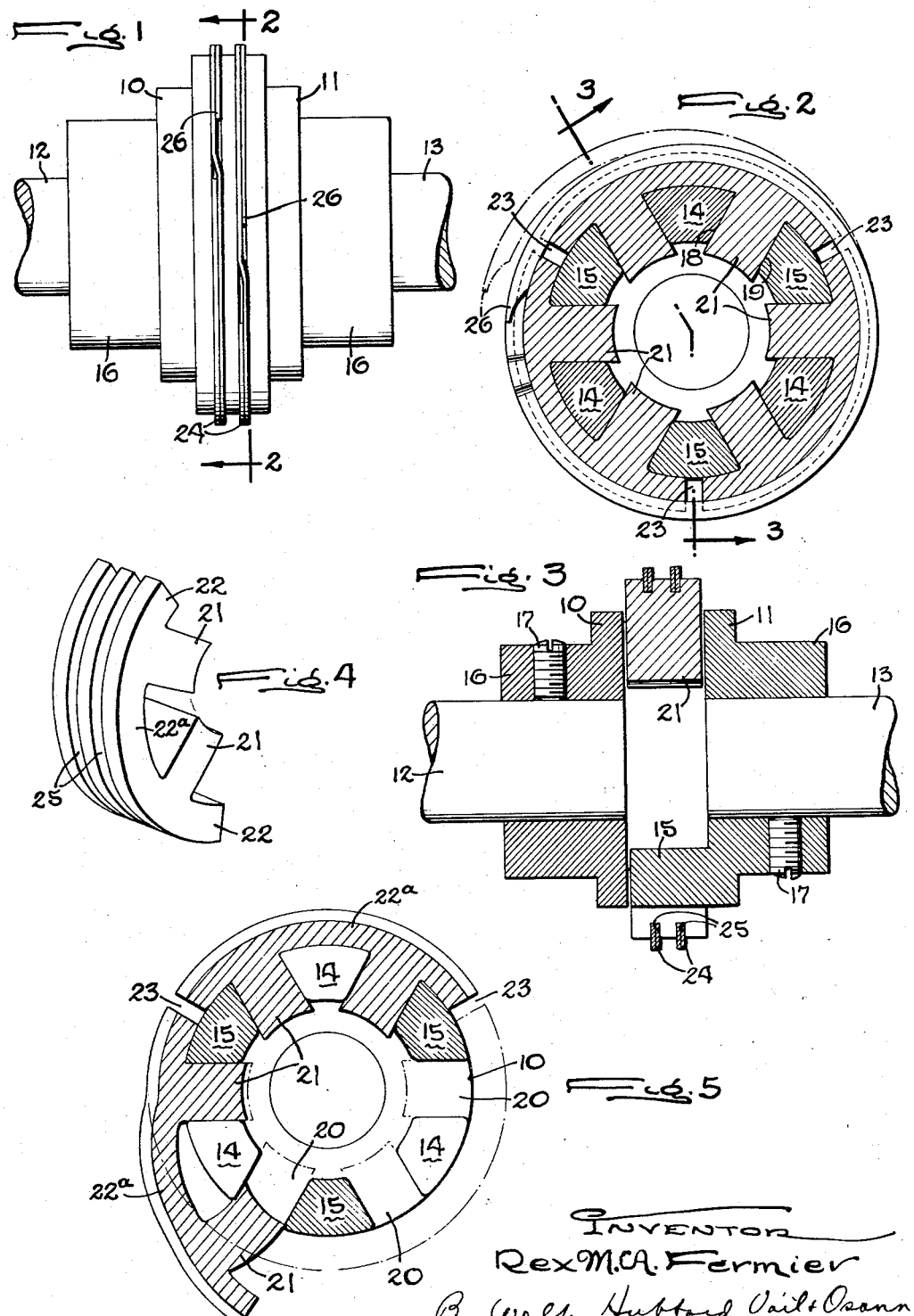

2,996,900
FLEXIBLE COUPLING
Rex M. A. Fermier, Chicago, Ill., assignor to Lovejoy Flexible Coupling Co., Chicago, Ill., a corporation of Illinois
Filed Jan. 11, 1960, Ser. No. 1,692
4 Claims. (Cl. 64—14)

This invention relates to flexible couplings of the intermeshing jaw type which may be disassembled by sidewise radial shifting of the jaw carrying members without axial separation thereof or disturbing the axial positions of the coupled shafts. Such a coupling is disclosed in Patent No. 2,074,940.

The primary object is to improve on the patented coupling by a novel construction of the blocks which transmit torque between the intermeshing jaws.

A more detailed object is to maintain the radial positions of the torque transmitting blocks through the use of circumferentially extending lugs formed integral with the outer ends of the blocks and held against the outer faces of the jaws by a simple encircling band.

Another object is to simplify the block positioning means by a crosspiece construction which serves for two adjacent blocks.

Other objects and advantages of the invention will become apparent from the following detailed description taken in connection with the accompanying drawings, in which FIGURE 1 is a side elevation of a coupling embodying the novel feaures of the present invention.

FIG. 2 is a sectional view taken along line 2—2 in FIG. 1.

FIG. 3 is a sectional view taken along line 3—3 in FIG. 2.

FIG. 4 is a perspective view of one of the power transmitting blocks.

FIG. 5 is a sectional view similar to FIG. 2 illustrating the manner of removing the power transmitting blocks.

FIG. 6 is a view similar to FIG. 2 with the torque transmitting blocks removed.

FIG. 7 is a similar view after partial separation of the two disks by relative sidewise movement.

FIG. 8 is a perspective view of one of the bands for holding the torque transmitting elements in place.

In couplings of the present type, two disk-like members 10 and 11 adapted to telescope with the adjacent ends of the shafts 12 and 13 to be coupled are formed with sets of jaws 14 and 15 angularly spaced around and projecting axially from the opposed faces of the disks into loosely intermeshing relation. Hubs 16 on the disks are secured to the respective shafts by set screws 17.

The adjacent jaws of the different sets are spaced apart circumferentially and have adjacent parallel sides 18 and 19 defining intervening recesses 20. Disposed in these recesses are torque transmitting elements in the form of blocks 21 of rectangular cross-section corresponding to the recesses and composed, for example, of yieldable material such as firm reinforced rubber so as to permit of some degree of universal swiveling between the disk 10 and 11 while transmitting torque from one disk to the other. For certain applications, the blocks 21 will be made of rigid material such as bronze while in other instances molded materials such as Bakelite or asbestos brake lining may be preferred.

During such power transmission, the blocks 21 must be held in fixed radial position by means which, as disclosed in the aforesaid patent, is disposed externally of the jaws 14 and 15 and is releasable to permit outward withdrawal and removal of the individual blocks. This is accomplished in accordance with the present invention by the formation at the outer ends of each block 21 a lug or crosspiece which projects laterally and circumferentially from the block so as to abut against the outer face of at least one of the adjacent jaws 14 or 15. The crosspieces thus constructed and lying in the same axial plane as the blocks and the jaws may be held against the respective jaws by a simple encircling band thereby holding the blocks in the proper radial position without any other interconnection with the jaws 14 and 15 or their supporting disks.

In the present instance, there are two such lugs 22 on each of the blocks, both being of arcuate shape and projecting circumferentially in opposite directions from the outer end of the block so as to overlap and lie in contact with the outer faces of the two jaws 14 and 15 which are disposed on opposite sides of the block. The latter and the two lugs are integral with each other and constitute a single T-shaped piece which may be molded in a single operation with the arcuate lugs 22 properly curved to fit closely around the arcuate outer surfaces of the adjacent jaws 14 and 15. Thus the two lugs form a crosspiece which seats against the adjacent jaws of the coupling and holds the connected block in a well defined radial position and against inward displacement.

When the blocks 21 and the integral lugs 22 are formed of yieldable material such as rubber, the lugs may be bent relative to the block. Because of this, the overall construction may be simplified by molding the crosspieces of two adjacent blocks 21 integral with each other. Thus, as illustrated in FIG. 5, the lugs of two of the adjacent blocks are connected integrally together to form a continuous bridge 22ᵃ to locate the blocks in proper angular relation with the other lugs projecting outwardly from the connected blocks. The blocks thus joined together by the bridge 22ᵃ may be flexed angularly relative to each other to permit the individual blocks, by bending of the connected crosspieces, to be inserted or removed from their recesses 20.

Preferably the arcuate crosspieces when arranged end to end do not form a complete circle but are separated at their adjacent ends by a gap 23. The latter permits of access to the ends of the crosspieces as by a suitable tool to enable such end to be bent outwardly away from the adjacent jaws as shown in FIG. 5. This, by a slight bending of the connected block 21, effects an outward and radial withdrawal of the block from its recess 20. Then, by continuing the bending of the crosspieces, the other block 21 on the same crosspiece may be withdrawn from between the pair of jaws which it separated.

Various kinds of bands may be employed for encircling the crosspieces 22 and holding the latter and the blocks 21 against outward displacement under the centrifugal force resulting from rotation of the coupling. Herein two bands 24 are employed and seated in outwardly opening squared grooves 25 axially spaced apart and molded into the outer peripheries of the crosspieces 22 and their connecting bridges 22ᵃ. Preferably, the bands 24 each comprises a plurality of turns of flat wire wound into the form of a helix with the adjacent turns, two in the present instance, normally lying in side to side contact and having an internal diameter only slightly larger than the bottom of the grooves 25. The end 26 of the helix and the adjacent turns may thus be separated axially from each other after which the full length of the helix may be threaded into one of the grooves. For this purpose, one end 26 while separated from the adjacent turn of the helix lying adjacent one side of the crosspieces 22 may be extended diagonally across the edge of the crosspieces and thus directed into the adjacent groove 25. Then, by holding this end in the groove and turning the helix about the axis of the coupling, the full length of the wire may be fed progressively into the groove. The assembly of the coupling is completed by threading the other helical band in a similar way into the other groove 25. Such threading of the bands is facilitated by yielding of the outer peripheries of the crosspieces 22, particularly the ribs defining the outer walls of the grooves.

To separate the coupled shafts 12, 13 by relative sidewise motion and without disturbing the positions of the disks 10 and 11 thereon, the bands 24 are first removed by reversing the threading procedure above described. This frees the blocks 21 for withdrawal from their recesses 20 after prying up the ends of the crosspieces 22 as illustrated in FIG. 5 and bending the bridge 22a to permit the two blocks thereon to be slid out of the recesses. The jaws 14 and 15 of the two sets are thus freed as shown in FIG. 6 so that the two disks 10 and 11 may be shifted sidewise relative to each other. By such bodily transaxial shifting of the shaft 12 and the disk 10 fastened thereto, one jaw 14 on this disk may be brought to a central position within the jaws 15 as shown in FIG. 7. Then, with the shafts held in this spaced relation, the disk 10 may be turned in either direction to swing the center jaw outwardly to the position shown in phantom between two of the jaws 15 on the disk 11. With two of the jaws 14 thus straddling one of the jaws 15, the sidewise shifting of the disk 10 may continue thus separating the disk completely from the jaws 15 of the disk 11.

Reassembly of the coupling may be effected simply by reversing the transaxial shifting and intervening turning of the two shafts. Thereafter, the blocks 21 may be pressed into the respective recesses 20 and clamped in place by threading the wires of the bands 24 into the grooves 25.

By forming the lugs 22 on the outer ends of the blocks 21, as above described, the blocks may be removed individually from between the intermeshing jaws thus permitting the sidewise separation of the two disks. The use of a simple encircling band to hold the blocks 22 in place is made possible by forming the lugs 22 integral with the outer ends of the block and extending the same circumferentially around the outer surface of the jaws so that the crosspieces and the intermeshing jaws all lie in a common axial plane. In this way, the disks 10 and 11 are of minimum axial length and need not be machined or otherwise formed to interfit with the blocks 21 on any part thereof.

I claim as my invention:

1. A flexible coupling comprising two disk-like members each having a set of angularly spaced jaws projecting toward the other member and intermeshing with the jaws thereof to define intervening parallel walled recesses, blocks each disposed in one of said recesses, means for holding each of said blocks in fixed radial position comprising arcuate crosspieces integral with the outer end of each block and projecting circumferentially in opposite directions therefrom, and a band encircling said crosspieces and contracting the same against the outer faces of the jaws adjacent the block.

2. A flexible coupling comprising two disk-like members each having a set of angularly spaced jaws projecting toward the other member and intermeshing with the jaws thereof to define intervening parallel walled recesses, blocks each disposed in one of said recesses, means for holding each of said blocks in fixed radial position comprising arcuate crosspieces integral with the outer end of each block and projecting circumferentially in opposite directions therefrom, a continuous annular outwardly opening groove formed in the peripheries of said crosspieces, and a band encircling said crosspieces and seated in said groove to hold the crosspieces against the outer faces of the adjacent jaws.

3. A flexible coupling comprising two disk-like members each having a set of angularly spaced jaws projecting toward the other member and intermeshing with the jaws thereof to define intervening parallel walled recesses, blocks each disposed in one of said recesses, means for holding each of said blocks in fixed radial position comprising arcuate crosspieces integral with the outer end of each block and projecting circumferentially in opposite directions therefrom, the crosspieces of two adjacent blocks being joined together integrally at their adjacent ends, and a band encircling said crosspieces and contracting the same against the outer faces of the adjacent jaws.

4. A flexible coupling as defined in claim 3 in which said blocks and crosspieces are composed of yieldable material so as to permit of relative flexing of the blocks on each crosspiece.

References Cited in the file of this patent

UNITED STATES PATENTS

| | | |
|---|---|---|
| 2,537,847 | Neher | Jan. 9, 1951 |
| 2,899,808 | Berens | Aug. 18, 1959 |
| 2,924,082 | Reich | Feb. 9, 1960 |